I. ILIEFF.
RESILIENT WHEEL.
APPLICATION FILED FEB. 9, 1918.
1,272,807.
Patented July 16, 1918.
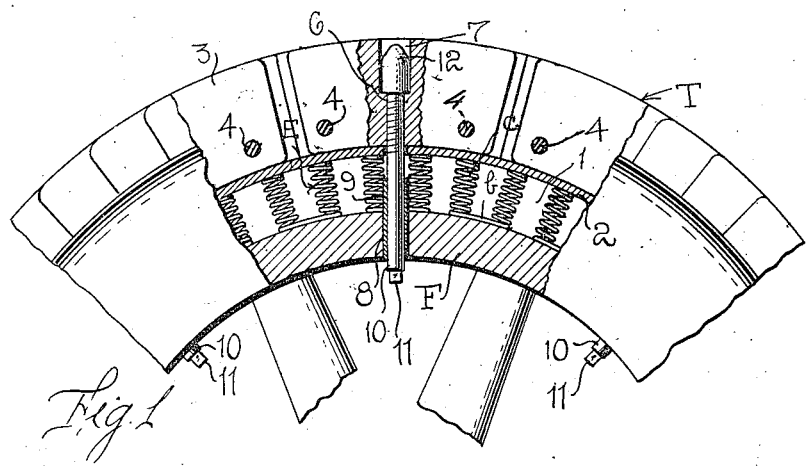
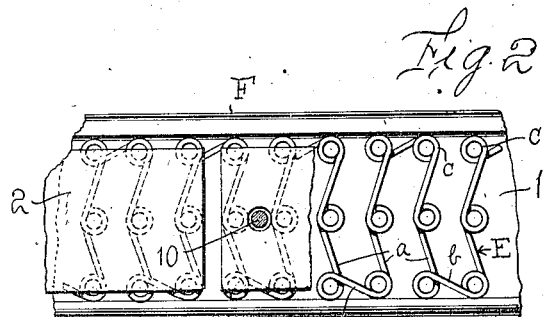
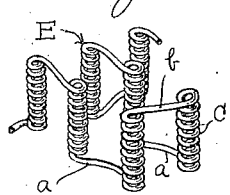
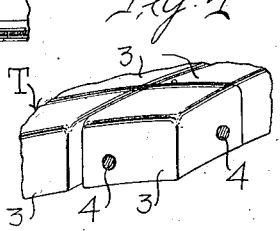
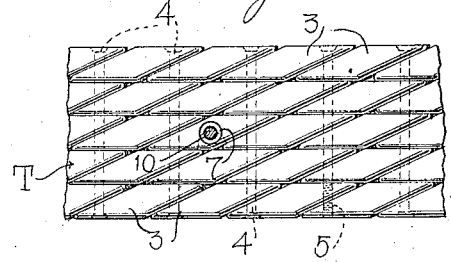
Inventor
Ilion Ilieff
By Watson E. Coleman
Attorney

UNITED STATES PATENT OFFICE.

ILION ILIEFF, OF WASHINGTON, DISTRICT OF COLUMBIA.

RESILIENT WHEEL.

1,272,807.

Specification of Letters Patent.

Patented July 16, 1918.

Application filed February 9, 1918. Serial No. 216,252.

*To all whom it may concern:*

Be it known that I, ILION ILIEFF, a citizen of Bulgaria, residing at Washington, in the District of Columbia, have invented certain new and useful Improvements in Resilient Wheels, of which the following is a specification, reference being had to the accompanying drawings.

This invention relates to certain improvements in resilient wheels and it is an object of the invention to provide a device of this general character having novel and improved means whereby the shocks and jars incident to travel are substantially absorbed.

It is also an object of the invention to provide a novel and improved device of this general character including a flexible tread member disposed circumferentially of the wheel together with a cushioning element interposed between the tread member and the felly of the wheel.

It is also an object of the invention to provide a novel and improved device of this general character including a tread member having anti-skidding members disposed therethrough and wherein said members are adjustable into and out of operative position.

Another object of the invention is to provide a novel and improved device of this general character wherein is employed a tread member consisting of a plurality of pivotally connected members or blocks of wear-resisting material and preferably metal together with a cushioning element interposed between said tread member and the felly of a wheel.

The invention consists in the details of construction and in the combination and arrangement of the several parts of my improved resilient wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in elevation and partly in section of a wheel constructed in accordance with an embodiment of my invention;

Fig. 2 is a fragmentary view in top plan of the device as herein embodied with the tread member removed and one of the anti-skidding members shown in section;

Fig. 3 is a top plan view of a tread member as herein set forth with an anti-skid member shown in section;

Fig. 4 is a fragmentary view in perspective of the tread member as herein disclosed with the pivotal members shown in section; and Fig. 5 is a fragmentary view in perspective of the cushioning element as herein employed.

As disclosed in the accompanying drawings F denotes the felly of a wheel provided in its periphery with the circumferentially disposed annular channel 1 substantially U-shape in cross section. Extending entirely around the felly and seated within the base portion of the channel 1 is a cushioning element E. As herein embodied this element E is formed of a single strand of material comprising a plurality of longitudinally spaced and reversely directed transverse portions $a$. The opposite ends of said portions $a$ are connected by the longitudinally disposed portions $b$. The portions $a$ at their ends and at substantially their centers are coiled as at $c$ whereby the element E possesses the desired cushioning function. Also positioned within the channel 1 and disposed circumferentially thereof is the flexible band 2 preferably metallic. When in applied position the extremities of the band 2 are free and out of contact. Contacting with the band 2 is the tread member T also disposed circumferentially of the felly F and having its inner portion extending within the channel 1.

The tread member T as herein set forth embodies a plurality of members or blocks 3 preferably formed of steel and each of said blocks is substantially diamond-shaped in top plan. The blocks 3 are preferably arranged in five series arranged side by side with the end portions of adjacent blocks of a series in mesh or in overlying relation. Disposed through the overlying portions of the blocks 3 and at a point inwardly of their centers are the pivotal members 4 and 5, the members 4 being herein disclosed as rivets whereby it will be self-evident that the blocks 3 when in assembled relation will possess the requisite flexiblity. The pivotal member 5 constitutes a threaded shank which is operatively engaged with certain of the intermeshing or overlying blocks 3 and is capable of ready application or removal so that the tread member T may be applied or removed when required. When it is desired to insert or withdraw the member 5 it is only necessary that sufficient strain be imposed upon the wheel to cause the portion of the tread member T with which the member 5 coacts to position said member 5 outwardly of the felly F.

As is particularly illustrated in Fig. 3, it is to be noted that the sides of the members 3 are parallel to the sides of the wheel body when the tread T is in applied position. By this arrangement the outer surface of the tread T is provided with a series of circumferentially disposed shoulders and an annular series of diagonally directed shoulders which serve to hold the tread against skidding and also from slipping.

At predetermined points circumferentially of the tread member, the central series of the blocks 3 have certain of said blocks provided with the threaded openings 6 having their outer portions 7 enlarged. The openings 6, when the member T is in applied position, are in radial alinement with the openings 8 produced in the felly F and which openings 8 are defined by the outwardly directed sleeves 9. Threaded through the openings 6 are the shanks 10 which also extend through the sleeves 9 and openings 8 and terminate inwardly of the felly F, and the inner end portions of said shanks 10 are provided with means as at 11 whereby said members may be rotated. The opposite or outer end portions of the members 10 are provided with the enlargements or heads 12 which are wholly confined within the enlarged portion 7 of the openings 6 when said members 10 are at the limit of their inward movement. Upon requisite rotation of the members 10 the enlargements or heads 12 may be extended a predetermined distance beyond the periphery of the tread member T so that said members 10 may be employed to effectively prevent slipping or skidding of the wheel in accordance with the requirements of practice.

The shanks 10 mounted in this manner also serve to hold the member or tread T against circumferential movement which would otherwise have a tendency to interfere with the efficiency of the element E.

From the foregoing description, it is thought to be obvious that a resilient wheel constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A wheel having its periphery provided with a circumferentially disposed channel, a tread member comprising a plurality of pivotally connected blocks, said tread member being disposed circumferentially of the periphery of the wheel and extending partially within the channel thereof, cushioning means interposed between the base of the channel and the tread member, said blocks of the tread member being substantially diamond-shape in plan and arranged in a plurality of series positioned side by side, the blocks of one series overlying the blocks of adjacent series, the sides of the blocks being parallel to the sides of the wheel and transversely disposed pivotal members connecting the blocks of the series.

2. The combination with the felly of a wheel provided with a circumferentially disposed annular channel, a flexible tread member disposed therearound, and a cushioning element interposed between the base of the channel and the tread member, said cushioning member being formed of a single strand of material and embodying a plurality of transversely disposed portions, the opposite extremities of adjacent transverse portions being alternately connected, said transverse portions being provided with coils extending outwardly of the felly.

3. In combination with the felly of a wheel provided with a circumferentially disposed annular channel, a flexible tread member disposed therearound, and a cushioning element interposed between the base of the channel and the tread member, said cushioning member being formed of a single strand of material and embodying a plurality of transversely disposed portions, the opposite extremities of adjacent transverse portions being alternately connected, said transverse portions being coiled at their extremities and midway their lengths.

In testimony whereof I hereunto affix my signature in the presence of two witnesses.

ILION ILIEFF.

Witnesses:
W. E. LAWSON,
G. E. LEWIS.